United States Patent

Schweizerhof

[15] 3,642,602

[45] Feb. 15, 1972

[54] ELECTROPLATING APPARATUS

[72] Inventor: Sigfrid Schweizerhof, Backnang, Germany

[73] Assignee: Licentia Patent-Verwaltungs-GmbH, Frankfurt, Germany

[22] Filed: Apr. 13, 1970

[21] Appl. No.: 27,974

[30] Foreign Application Priority Data

Apr. 11, 1969 Germany ......................P 19 18 354.1

[52] U.S. Cl. ................................204/211, 204/228, 204/28, 204/206

[51] Int. Cl. ..........................................................C23b 5/74

[58] Field of Search .................................204/206–211, 228

[56] References Cited

UNITED STATES PATENTS

| | | | |
|---|---|---|---|
| 3,474,009 | 10/1969 | Wang | 204/35 |
| 2,370,973 | 3/1945 | Lang | 204/28 X |
| 3,189,532 | 6/1965 | Chow et al. | 204/28 |
| 3,227,635 | 1/1966 | Koretzky et al. | 204/28 |
| 3,441,494 | 4/1969 | Oshima et al. | 204/228 |

*Primary Examiner*—F. C. Edmundson
*Attorney*—Spencer & Kaye

[57] ABSTRACT

In electroplating an anisotropic magnetic film onto wires, current through the wires during the plating process is used to create the magnetic anisotropy in the film. The resulting voltage drop along the length of the cathodic wires results in nonuniform chemical composition in the film along the length of the wires. Such nonuniform compositions are eliminated in the apparatus and method of the present invention by providing an equal voltage drop along the length of the anode.

4 Claims, 5 Drawing Figures

Inventor:
Sigfrid Schweizerhof

BY Spencer & Kaye
ATTORNEYS.

Inventor:
Sigfrid Schweizerhof

BY Spencer & Kaye
ATTORNEYS.

ELECTROPLATING APPARATUS

BACKGROUND OF THE INVENTION

The present invention relates to an apparatus and a method for producing compositionally uniform anisotropic magnetic films by electroplating such film onto current conductors.

So-called magnetic plated wire storage devices have become considerably important for data processing. These devices use thin, nonmagnetic wires (called carrier wires), which have been electroplated with a thin magnetic metallic layer which is capable of storing information. The metallic layer is preferably an iron-nickel alloy of determined composition. In order to produce the circular magnetic anisotropy which is necessary to make the magnetic layers capable of storing information, the carrier wire must be conducting a direct current of suitable size during deposition of the metallic layer. This direct current, called the field current, causes an unavoidable potential drop over the length of the carrier wire. This potential drop is superimposed on the voltage between the anode and the cathode and leads to an undesired variation in the plating potential along the length of the cathodic carrier wire. In the case of stationary cathode wire, this variation in plating potential leads to a variation of the metallic layer thickness and in the alloy composition over the length of the carrier wire. For a wire which is plated while moving, the variation in the plating potential results in a variation in the alloy composition in the direction of the layer thickness. Such layer nonuniformities are extremely damaging to the ability of the magnetic wire to store information.

Efforts to avoid the above-described difficulty in the manufacture of magnetic information-storing wires have taken two different routes:

Usually, the effect of the field current flowing in the carrier wire is decreased by the simple procedure of keeping the deposition zone on the length of the wire very short. The evident disadvantage of this method lies in a very slow production rate. In order to try to overcome this disadvantage of slow production rate, the deposition voltage is maintained as high as possible in order to decrease the relative influence of the voltage drop on the wire, and several short deposition cells are arranged in series and provided with separate current sources. On the whole, this method is however not very satisfactory, both from a technical and from an economic point of view.

Consequently, it has additionally been proposed that the carrier wire be electrically insulated by an insulating layer before coating with the metallic layer, so that the voltage drop caused by the field current can no longer influence the layer deposition. When one considers the additional technological processing steps which arise on this route and the technologically somewhat difficult further processing of such magnetic wire, this route also is not completely satisfactory.

SUMMARY OF THE INVENTION

An object of the present invention, therefore, is to provide technologically and economically improved apparatus and method for the uniform electroplating of elongated cathodes directly onto their metallic surfaces without the interposition of an insulating layer, especially the electroplating of thin nonmagnetic wires with a thin magnetic metallic layer capable of storing information, which wires conduct an auxiliary, field current independent of the deposition current during electroplating.

This as well as other objects which will become apparent in the discussion that follows are achieved, according to the present invention, by providing an anode extending parallel to the cathode, the anode carrying in its longitudinal direction an auxiliary current that produces in the anode a voltage drop of the same sign and same magnitude as that produced by the field current in the cathode.

DESCRIPTION OF THE PREFERRED EMBODIMENTS

Figure 1:
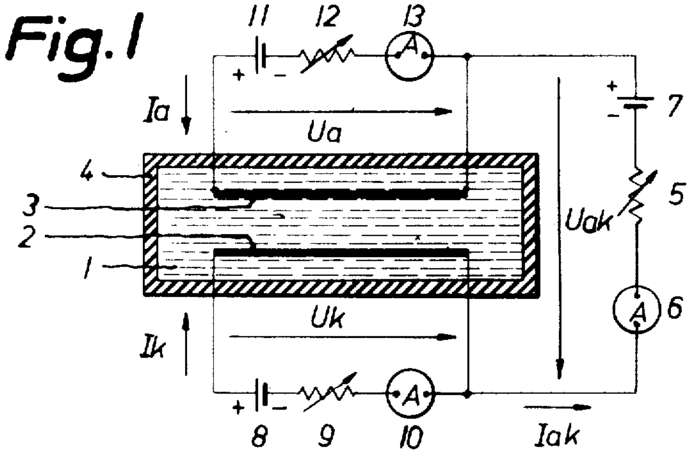
FIGS. 1 through 4 are partially sectional, partially schematic views of different embodiments of the present invention.

In the drawings like reference numerals designate like parts. Referring first to FIG. 1 of the drawings, the cathode 2 and the anode 3 are extended parallel to one another on their hookup wire in liquid electrolyte 1 present in container 4. Container 4 is made of insulating material such as hard rubber or glass. The anode and the cathode can, for example, be made of wire, band or plate of constant cross section in planes perpendicular to their longitudinal directions. They are arranged directly opposite one another. Deposition voltage U*ak* and current I*ak* are provided from voltage source 7. Both deposition voltage and current are adjustable by the variable resistance 5. The current is readable on ammeter 6. During plating, the cathode carries another current besides I*ak*. This other current, I*k*, arises from voltage source 8 and can be read on ammeter 10 and adjusted by variable resistance 9. Current I*k* causes a voltage drop U*k* across the length of the cathode. This voltage drop U*k* is superimposed on the deposition voltage U*ak*. In the past, this current I*k*, called the field current and whose purpose it is to create magnetic anisotropy, has disturbed the uniformity of the deposition on the cathode. Its disturbing effect is eliminated according to the present invention by providing a voltage drop U*a* across the anode. This voltage drop U*a* equals U*k* both in sign and in magnitude. The voltage U*a* is caused by auxiliary current I*a* arising from voltage source 11, readable on ammeter 13, and adjustable by means of variable resistance 12. With the presence of the voltage drop U*a*, the coating of the cathode proceeds uniformly at all points along the length of the cathode under the sole action of the deposition voltage U*ak*.

Figure 2:
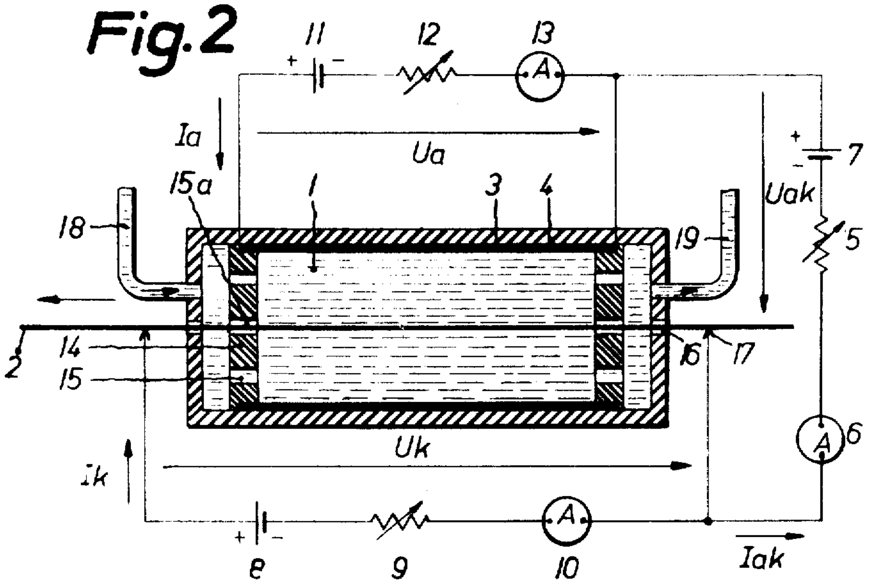

FIG. 2 shows an apparatus for the continuous electroplating of a cathode 2 drawn continuously through the electrolyte. In this embodiment, the cathode 2 is in the form of a wire. Container 4 has a cylindrical form and holds the anode 3, also in the form of a cylinder, concentrically about the moving cathode 2. In this embodiment, the anode is inert; that is, it does not go into solution during plating. The ends of the anode are closed off by means of flanges 14 made of insulating material. The cathode 2, in the form of a carrier wire, is moved through the electrolyte through bores 15*a* in flanges 14 and corresponding, central, sealed bores 16 of container 4. The voltage U*k* is placed on the cathode by means of sliding or roller contacts 17. The resistance of the cylindrical anode in its longitudinal direction is of such a size that the requisite voltage drop *Ua*=*Uk* is achieved at a reasonable current I*a* that does not overload the various conductors and source 11 in the circuit. Ion depletion in the electrolyte bath is prevented by exchanging the electrolyte continuously by means of the lines 18 and 19 which may, for example, be connected into a pump and a large-volume container of electrolyte. The electrolyte moves into the plating volume through holes 15 in the flanges 14. If it is desired to operate at high-current densities, the circulation of the electrolyte can be increased to produce turbulent flow in the deposition area between cathode and anode.

Figure 3:
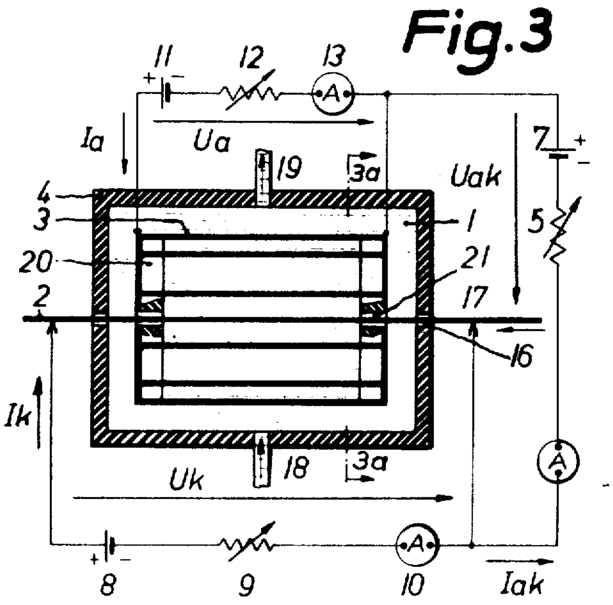
Figure 3A:
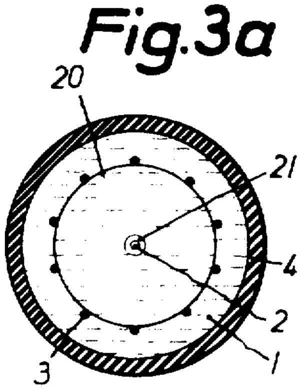
FIG. 3*a* is a section of FIG. 3 along the section line A–B of FIG. 3.

FIGS. 3 and 3*a* show an apparatus similar to the apparatus of FIG. 2. However, here, the anode 3, while still cylindrical, is held centrally in container 4 and does not touch the container wall. And, instead of being in the form of a continuous cylinder as in FIG. 2, the anode here is in the form of a cage of wires which do not go into solution during plating, such as platinum wires. The individual wires of the cage run parallel to the cathode 2, here also in the form of a moving wire as in FIG. 2, and are supported at their ends on two transverse discs 20 of insulating material. All of the individual wires are connected electrically in parallel. Discs 20 are provided with central bores 21 through which cathode 2 moves. An advantage of embodiment of FIG. 3 is that the effective resistance of the anode in its longitudinal direction can be easily adjusted by placing more or less wires in the cage. Another advantage is that transverse convection of the electrolyte through the space between the anode and the cathode becomes possible due to the open structure of the anode cage. Thus, the lines 18 and 19 are arranged and directed transversely in FIG. 3.

Figure 4:
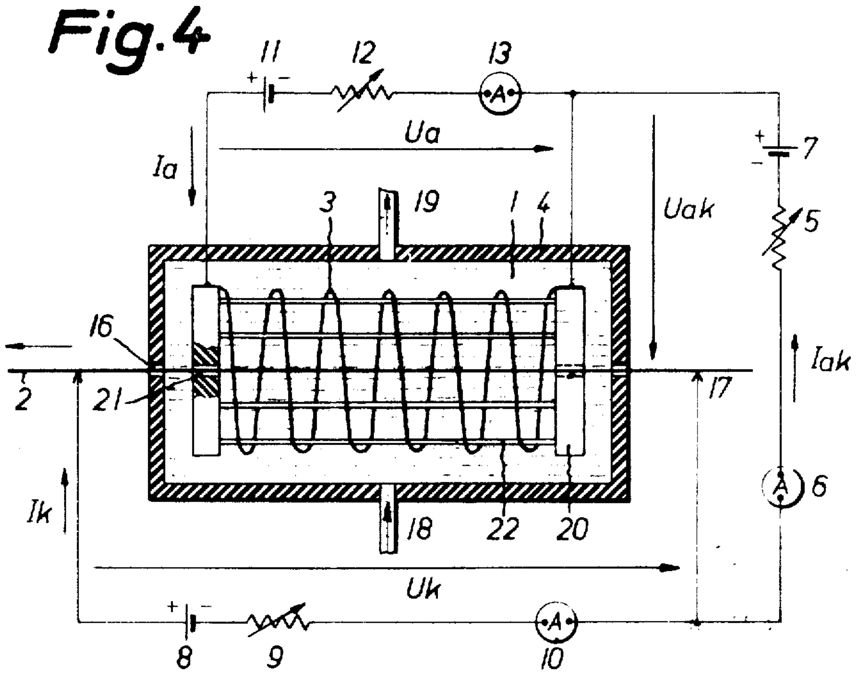

FIG. 4 shows an embodiment of the invention similar to the embodiment shown in FIG. 3. Here, the anode 3 is in the form of a single wire wound into a concentric, cylindrical helix about the cathode 2. The anode wire is supported on struts 22 running parallel to cathode 2. Cathode 2 is here also in the form of a wire. The ends of the anode are secured onto the discs 20. As the pitch of the helix is decreased, the embodiment of FIG. 4 compensates always more accurately the variation in deposition voltage along the cathode. Should the small magnetic field in the longitudinal direction caused by current *Ia* be disturbing to the magnetic anisotropy of the plate of the carrier wire, this longitudinal magnetic field can be compensated by an auxiliary coil of opposite field direction arranged outside of the container 4.

It is inherent in the present invention, that there exists a given ratio between *Ia* and *Ik*. Thus, a planned or unplanned change in *Ik* requires a corresponding change in *Ia*. While such adjustment can be effected manually using resistance 12, conventional automatic circuitry exists to automatically carry out such adjustment of *Ia* as a function of *Ik*.

For a man skilled in the art the method of creating a voltage drop *Ua* equal to *Uk* provides no difficulties. He only has to take care that the ohmic resistance of the anode relative to the auxiliary current is not so small as to heat the anode too strongly. Examples of suitable plating bath compositions, temperatures, field strengths required for creating anisotropy, etc., are disclosed in the U.S. Pat. No. 3,027,309, issued to James Henry Stephen on Mar. 27, 1962, for "Methods of Depositing Nickel-Iron Films."

It will be understood that the above description of the present invention is susceptible to various modifications, changes and adaptations, and the same are intended to be comprehended within the meaning and range of equivalents of the appended claims.

What is claimed is:

1. An apparatus for the uniform electroplating of elongated cathodes, suitable for the electroplating of anisotropically magnetic metal coatings, comprising in combination: container means for containing an electroplating bath, an elongated cathode supported relative to said container means within said container means, an elongated anode supported relative to said container means within said container means, the cathode and anode being mutually opposite and parallel, auxiliary cathode current means for maintaining an electrical current from one end of the cathode to the other end, whereby a voltage drop is produced across the cathode, plating voltage means for maintaining a plating voltage between the cathode and anode, and auxiliary anode current means for maintaining an electrical current through said anode for producing across the anode a voltage drop of the same sign and magnitude possessed by the voltage drop produced by the auxiliary cathode current means across the cathode.

2. An apparatus as claimed in claim 1, said cathode being a wire, said anode being a cylinder arranged concentrically about said cathode.

3. An apparatus as claimed in claim 1, said anode being a cage of mutually parallel wires extending parallel to the cathode, the cathode being a wire, the cage being concentric to the cathode, the wires of the cage being connected in parallel.

4. An apparatus as claimed in claim 1, said cathode being a wire, said anode being a wire in a cylindrical helix concentric to said cathode.

* * * * *